US012663117B2

(12) United States Patent
    Dutheil et al.

(10) Patent No.: US 12,663,117 B2
(45) Date of Patent: Jun. 23, 2026

(54) AIRPORT INSTALLATION INCLUDING A PLURALITY OF DIHYDROGEN STORAGE TANKS

(71) Applicants: Airbus SAS, Blagnac (FR); Airbus Operations SAS, Toulouse (FR)

(72) Inventors: Jean-Philippe Dutheil, Toulouse (FR); Jonathan Landolt, Blagnac (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 0 days.

(21) Appl. No.: 18/887,503

(22) Filed: Sep. 17, 2024

(65) Prior Publication Data

US 2025/0102113 A1     Mar. 27, 2025

(30) Foreign Application Priority Data

Sep. 26, 2023    (FR) ................................. FR2310199

(51) Int. Cl.
   *F17C 5/00*        (2006.01)
   *B64D 37/16*      (2006.01)
   *B64F 1/36*        (2024.01)

(52) U.S. Cl.
   CPC .............. *F17C 5/007* (2013.01); *B64D 37/16* (2013.01); *B64F 1/36* (2013.01); *F17C 2205/013* (2013.01); *F17C 2221/012* (2013.01); *F17C 2223/033* (2013.01); *F17C 2265/065* (2013.01); *F17C 2270/0189* (2013.01)

(58) Field of Classification Search
   CPC ................ F17C 5/007; F17C 2205/013; F17C 2221/012; F17C 2223/033; F17C 2265/065; F17C 2270/0189; B64D 37/16; B64F 1/36

USPC ............................................................. 141/1
See application file for complete search history.

(56) References Cited

U.S. PATENT DOCUMENTS

| | | | | |
|---|---|---|---|---|
| 10,883,664 B2 * | 1/2021 | Heydorn | ............... | F17C 13/005 |
| 2014/0352840 A1 * | 12/2014 | Blanchet | ................... | F17C 5/06 |
| | | | | 141/69 |
| 2016/0216715 A1 | 7/2016 | Lapena-rey et al. | | |
| 2020/0313209 A1 | 10/2020 | Rainville et al. | | |

(Continued)

FOREIGN PATENT DOCUMENTS

| | | |
|---|---|---|
| CN | 216010426 U | 3/2022 |
| WO | 202144087 A1 | 7/2021 |
| WO | 2023041401 A1 | 3/2023 |

OTHER PUBLICATIONS

Website: https://www.osti.gov/etdeweb/servlets/purl/20599211 (presents several methods of calculating the saturation pressure of hydrogen, not relied upon as prior art) (Year: 2025).*

(Continued)

*Primary Examiner* — Craig M Schneider
(74) *Attorney, Agent, or Firm* — Greer, Burns & Crain, Ltd.

(57) ABSTRACT

An airport installation including a plurality of types of aircraft in which each aircraft of one type includes a tank containing dihydrogen at a saturation pressure in a first range different from the other first ranges, for each type of aircraft a storage tank at a saturation pressure in a second range associated with the type of aircraft, and for each storage tank pumps or other devices fill from the storage tank the tank of the aircraft of the type for which the first range corresponds to the storage tank.

8 Claims, 2 Drawing Sheets

(56)  References Cited

U.S. PATENT DOCUMENTS

| 2023/0120575 A1* | 4/2023 | Buhl | ........................ | F17C 7/00 |
| 2023/0159185 A1 | 5/2023 | Minas | | |
| 2023/0349513 A1 | 11/2023 | Bernhardt | | |
| 2023/0366513 A1* | 11/2023 | Minas | ........................ | F17C 6/00 |

OTHER PUBLICATIONS

French Search Report for corresponding French Patent Application No. 2310199 dated Mar. 29, 2024.

* cited by examiner

AIRPORT INSTALLATION INCLUDING A PLURALITY OF DIHYDROGEN STORAGE TANKS

CROSS-REFERENCES TO RELATED APPLICATIONS

This application claims the benefit of French Patent Application Number 2310199 filed on Sep. 26, 2023, the entire disclosure of which is incorporated herein by way of reference.

FIELD OF THE INVENTION

The present invention concerns an airport installation including a plurality of storage tanks at different saturation pressures in order to be able to supply different types of aircraft and a method of managing an airport installation of this kind.

BACKGROUND OF THE INVENTION

In the context of reducing the consumption of kerosene in aircraft engines it is known to use dihydrogen as fuel. To this end the aircraft includes a dihydrogen tank and the airport includes a dihydrogen storage tank and a bowser travels between the two to fill the storage tank and the tank to fill the latter.

Dihydrogen is generally stored at low temperature in the airport storage tank and the tank of the aircraft. The dihydrogen storage temperature depends among other things on the saturation pressure inside the tank and, the higher the temperature, the higher the saturation pressure.

Each aircraft tank is designed to function with a particular saturation pressure that ensures a particular equilibrium between liquid dihydrogen and gaseous dihydrogen.

WO2023/041401 discloses an airport installation having means for supplying aircraft with dihydrogen including for each type of aircraft a storage tank at a saturation pressure in a range different from other ranges and for each storage tank filling means intended to fill from said storage tank the tank of the aircraft corresponding to said storage tank.

If the saturation pressure of the storage tank is lower than the saturation pressure of the tank of the aircraft it is necessary to heat the dihydrogen to increase its saturation pressure, which leads to an additional consumption of energy.

If the saturation pressure of the storage tank is higher than the saturation pressure of the tank of the aircraft it is necessary to ventilate the tank of the aircraft by allowing dihydrogen to escape, which leads to a loss of dihydrogen.

To limit losses an airport installation is therefore needed that addresses the requirements linked to the storage of dihydrogen in the aircraft tanks.

SUMMARY OF THE INVENTION

An object of the present invention is to propose an airport installation that includes a plurality of dihydrogen storage tanks at different saturation pressures in order to be able to supply different types of aircraft.

To this end there is proposed an airport installation including:

a plurality of types of aircraft in which each aircraft of one type includes a tank intended to contain dihydrogen at a saturation pressure in a first range from a plurality of first ranges, where each first range is different from the other first ranges, for each type of aircraft a storage tank at a saturation pressure in a second range different from the other second ranges, and for each storage tank filling means intended to fill from said storage tank the tank of the aircraft corresponding to said storage tank.

In the various embodiments of the present invention, the aircraft tanks and the storage tanks are matched in terms of their saturation pressure ranges. Such range matching enables reduced adaptation of pressure in the aircraft tanks and the storage tanks and therefore enables reduced losses of dihydrogen.

With an installation of this kind it is possible to fill the tanks of different types of aircraft with limited losses.

The invention also proposes a method of managing an airport installation according to the foregoing variant in which starting from a situation in which the first storage tank is at a first degree of filling such that it is at a saturation pressure in the second range of 1.05 bar to 1.2 bar, in which the second storage tank is at a second degree of filling such that it is at a saturation pressure in the second range of 2 bar to 3 bar, in which the third storage tank is at a third degree of filling such that it is at a saturation pressure in the second range of 4 bar to 5 bar, in which the fourth storage tank is at a fourth degree of filling such that it is at a saturation pressure higher than 5 bar, each storage tank passes successively and in parallel from the first degree of filling with a saturation pressure in the second range of 1.05 bar to 1.2 bar to the second degree of filling with a saturation pressure in the second range of 2 bar to 3 bar to the third degree of filling with a saturation pressure in the second range of 4 bar to 5 bar to the fourth degree of filling with a saturation pressure higher than 5 bar and to the first degree of filling with a saturation pressure in the second range of 1.05 bar to 2 bar, and so on.

With a method of this kind it is possible to fill the tanks of different types of aircraft with limited losses of dihydrogen.

BRIEF DESCRIPTION OF THE DRAWINGS

The features of the invention mentioned hereinabove and others will become more clearly apparent on reading the following description of one embodiment, said description being given with reference to the appended drawings, in which.

DETAILED DESCRIPTION OF THE PREFERRED EMBODIMENTS

Figure 1:
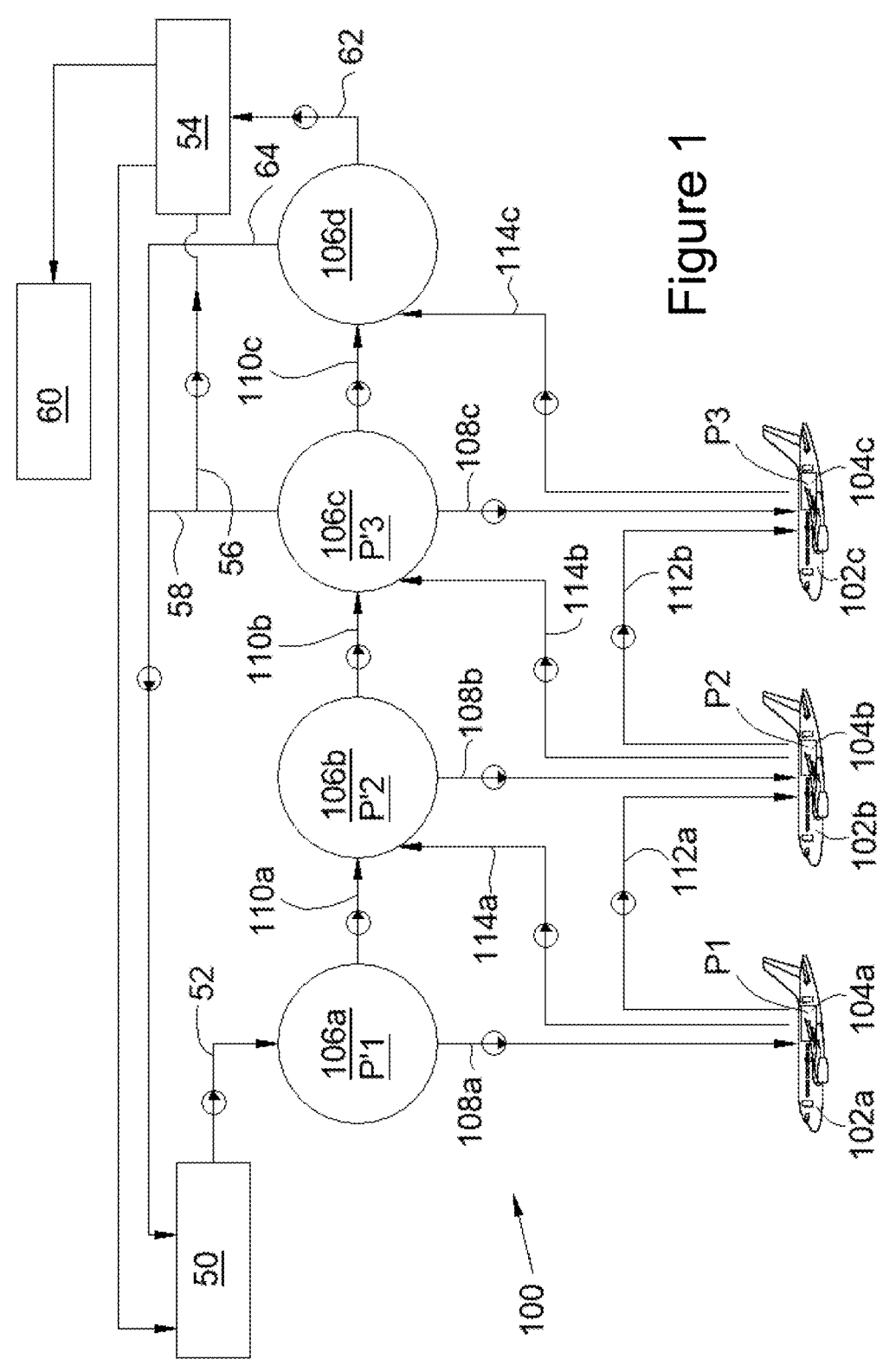
FIG. 1 is a schematic representation of an airport installation in accordance with a first embodiment of the invention.
Figure 2:
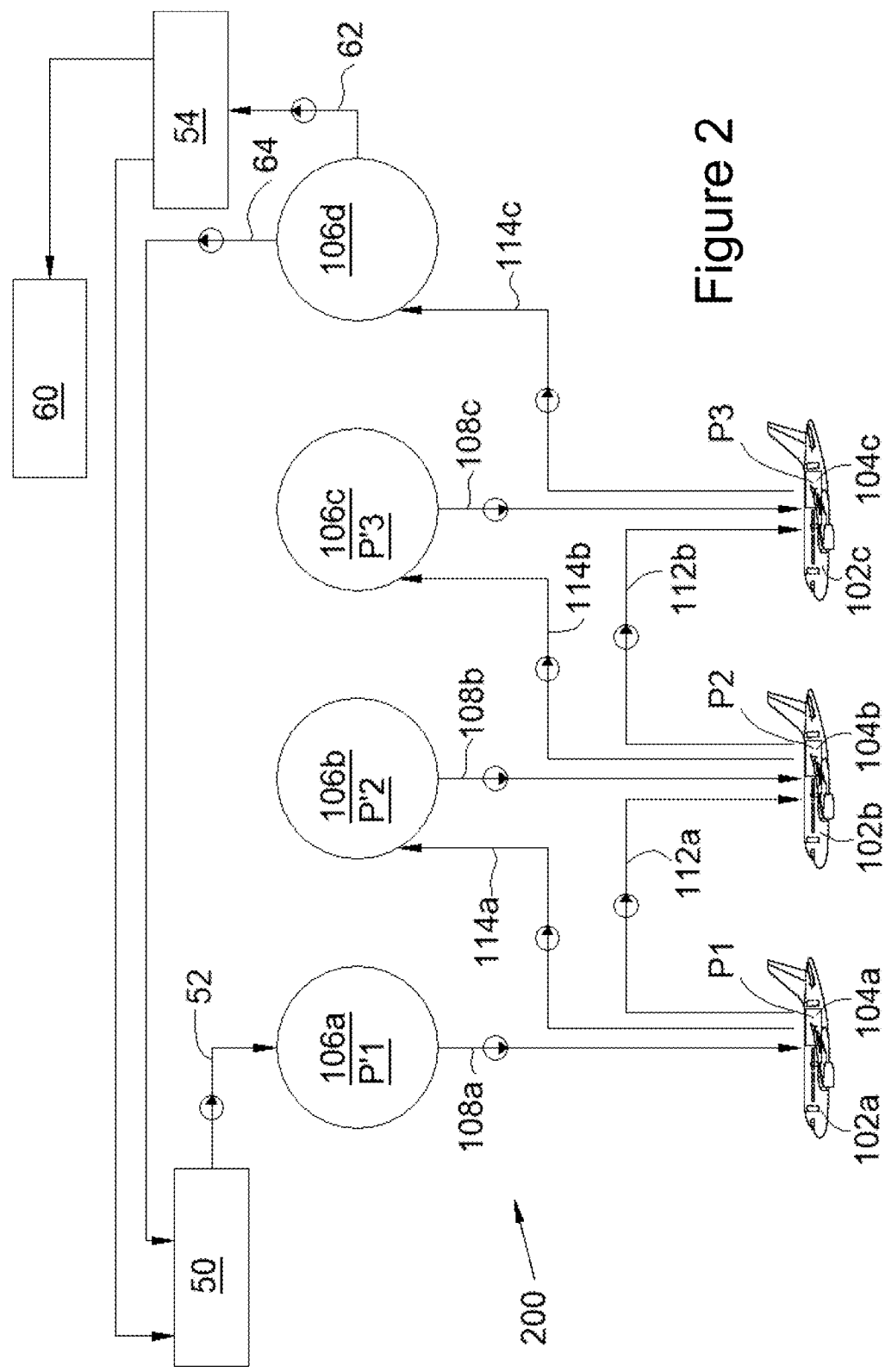
FIG. 2 is a schematic representation of an airport installation in accordance with a second embodiment of the invention.

FIG. 1 shows an airport installation 100 in accordance with a first embodiment of the invention and FIG. 2 shows an airport installation 200 in accordance with a second embodiment of the invention.

The airport installation 100, 200 enables supply of dihydrogen to different types of aircraft 102*a-c*, here three types.

Each aircraft 102*a-c* includes a tank 104*a-c* that contains dihydrogen at a particular saturation pressure depending on the type of aircraft 102*a-c*.

Each tank 104*a-c* of an aircraft 102*a-c* of a particular type therefore contains dihydrogen at a saturation pressure in a first range P1, P2, P3 from a plurality of first ranges P1, P2, P3.

In accordance with one particular embodiment of the invention the saturation pressure for an aircraft of the first type 102*a* is in the first range P1 equal to 1.2 bar to 2 bar, the saturation pressure for an aircraft of the second type 102*b* is in the first range P2 equal to 2 bar to 4 bar, and the saturation pressure for an aircraft of the third type 102*c* is in the first range P2 equal to 4 bar to 6 bar.

Each first range P1, P2, P3 is different from the other first ranges P1, P2, P3, which is to say that the first ranges P1, P2, P3 do not overlap, although they may have common boundaries.

For each type of aircraft 102*a-c* and therefore for each first range P1, P2, P3 the airport installation 100, 200 includes a storage tank 106*a-c* that is at a saturation pressure in a second range P'1, P'2, P'3 where for each type the second range P'1, P'2, P'3 is different from the other second ranges P'1, P'2, P'3, which is to say that the second ranges P'1, P'2, P'3 do not overlap, although they may have common boundaries.

In the embodiment of the invention shown here for the first type of aircraft 102*a* a first storage tank 106*a* is at a saturation pressure that is in the second range P'1 equal to 1.05 bar to 1.2 bar, for the second type of aircraft 102*b* a second storage tank 106*b* is at a saturation pressure that is in the second range P'2 equal to 2 bar to 3 bar, and for the third type of aircraft 102*c* a third storage tank 106*c* is at a saturation pressure that is in the second range P'3 equal to 4 bar to 5 bar.

In the embodiment of the invention shown here two of the second ranges, namely P'2 and P'3, are therefore included in the first range P2 and P3 associated with the type of aircraft 102*b-c*.

Even if the range P'1 of 1.05 bar to 1.2 bar is not included in the range P1 of 1.2 bar to 2 bar, the dihydrogen is heated during its transfer from the storage tank 106*a* to the tank 104*a* of the aircraft 102*a*, which leads to an increase in the saturation pressure and the dihydrogen arrives in the tank 104*a* of the aircraft 102*a* with a saturation pressure of at least 1.2 bar. Thus, the saturation pressure of the dihydrogen is included in the first range P1.

Generally speaking, dihydrogen is therefore stored in a storage tank 106*a-c* at a saturation pressure in a second range P'1, P'2, P'3 that is such that the saturation pressure of the dihydrogen that arrives in the tank 104*a-c* of the aircraft 102*a-c* is included in the first range P1, P2, P3 corresponding to the aircraft 102*a-c*.

To supply each type of aircraft 102*a-c* from the storage tank 106*a-c* the saturation pressure of which is compatible with the saturation pressure of the tank 104*a-c* of the type concerned the airport installation 100, 200 also includes for each storage tank 106*a-c* filling means 108*a-c* that fill the tank 104*a-c* of the aircraft 102*a-c* of the compatible type from the storage tank 106*a-c* concerned.

Thus the filling means 108*a* are for filling the tank 104*a* of the aircraft 102*a* of the first type corresponding to the first range P1 from the first tank 106*a* corresponding to the second range P'1, the filling means 108*b* are for filling the tank 104*b* of the aircraft 102*b* of the second type corresponding to the first range P2 from the second tank 106*b* corresponding to the second range P'2, and the filling means

108*c* are for filling the tank 104*c* of the aircraft 102*c* of the third type corresponding to the first range P3 from the third tank 106*c* corresponding to the second range P'3.

The filling means 108*a-c* are for example bowsers that transport dihydrogen from a storage tank 106*a-c* to a tank 104*a-c* of the aircraft 102*a-c*. The tank of the bowser may be adapted to function with all the second ranges P'1, P'2, P'3 provided or with only one of them in which case there is a bowser for each second range P'1, P'2, P'3.

The filling means 108*a-c* may equally well be pipes equipped with pumps.

In the embodiments of the invention shown here dihydrogen is delivered into the first storage tank 106*a* from a liquefaction system 50 that liquefies the dihydrogen at the saturation pressure corresponding to the second range P'1 of the lowest pressures, that is to say the second range 1.05 bar to 1.2 bar here. The dihydrogen is transported from the liquefaction system 50 to the first storage tank 106*a* by any appropriate first transport means 52, such as a bowser or a pipe with a pump.

In a first variant of the first embodiment, as the temperature of the dihydrogen in the storage tank 106*c* at the saturation pressure corresponding to the highest pressures increases, the saturation pressure of said storage tank 106*c* also increases and to prevent it leaving the second range (here P'3) some of the dihydrogen is evacuated to a fuel cell 54 or to the liquefaction system 50 by appropriate second transport means 56, respectively appropriate third transport means 58 such as a bowser or a pipe with a pump.

The fuel cell 54 can supply the liquefaction system 50 or any other electrical system 60 with electricity.

In a second variant of the first embodiment of the invention and in the second embodiment the airport installation 100, 200 includes a fourth storage tank 106*d* that is at a saturation pressure higher than 5 bar.

In this case, to limit heating of the dihydrogen in the fourth storage tank 106*d* some of the dihydrogen is evacuated to the fuel cell 54 or to the liquefaction system 50 by appropriate fourth transport means 62, respectively appropriate fifth transport means 64 such as a bowser or a pipe with a pump.

In accordance with one particular embodiment the airport installation 100, 200 includes a first transfer system 112*a* that transfers dihydrogen from the tank 104*a* of an aircraft 102*a* of the first type of aircraft 102*a* to the tank 104*b* of an aircraft 102*b* of the second type of aircraft 102*b* and a second transfer system 112*b* that transfers dihydrogen from the tank 104*b* of the aircraft 102*b* of the second type of aircraft 102*b* to the tank 104*c* of the aircraft 102*c* of the third type of aircraft 102*c*.

With an arrangement of this kind, when the temperature of the dihydrogen in the tank 104*a-b* of an aircraft 102*a-b* increases, the dihydrogen is transferred to the tank 104*b-c* of the aircraft 102*b-c* for which the first range includes pressures higher than that of the first range of the original aircraft 102*a-b*.

Each transfer system 112*a-b* is for example a bowser or a pipe with a pump.

In accordance with one particular embodiment of the invention the airport installation 100, 200 includes a first filling system 114*a* that transfers dihydrogen from the tank 104*a* of the aircraft 102*a* of the first type of aircraft 102*a* to the second storage tank 106*b* and a second filling system 114*b* that transfers dihydrogen from the tank 104*b* of the aircraft 102*b* of the second type of aircraft 102*b* to the third storage tank 106*c*.

When the fourth storage tank 106*d* is present the airport installation 100, 200 includes a third filling system 114*c* for transferring dihydrogen from the tank 104*c* of the aircraft 102*c* of the third type of aircraft 102*c* to the fourth storage tank 106*d*.

When the temperature of the dihydrogen in the tank 104*a-c* of an aircraft 102*a-c* increases, it is therefore transferred to the storage tank 106*b-d* the second range of which includes pressures or the saturation pressure of which is higher than those of the first range of the original aircraft 102*a-c*.

Each filling system 114*a-c* is for example a bowser or a pipe with a pump.

In the first embodiment of the invention the airport installation 100 includes a first overspill system 110*a* that transfers dihydrogen from the first storage tank 106*a* to the second storage tank 106*b*, and a second overspill system 110*b* that transfers dihydrogen from the second storage tank 106*b* to the third storage tank 106*c*, and, when the fourth storage tank 106*d* is present, a third overspill system 110*c* that transfers dihydrogen from the third storage tank 106*c* to the fourth storage tank 106*d*.

When the temperature of the dihydrogen in a storage tank 106*a* increases, it is therefore transferred to the storage tank 106*b-d* the second range of which includes pressures or the saturation pressure of which is higher than those of the second range of the original storage tank.

Each overspill system 110*a-c* is for example a bowser or a pipe with a pump.

In the second embodiment of the invention the storage tanks 106*a-d* are fluidically independent of one another, that is to say that there is no transfer of dihydrogen between them.

In the second embodiment of the invention, to overcome the absence of overspill systems, the saturation pressure of each storage tank 106*a-d* regularly changes because it is emptied or the dihydrogen is heated. There is then a cyclic change of the second ranges and of the saturation pressure higher than 5 bar.

Thus, in the example of FIG. 2 the saturation pressure of the first storage tank 106*a* is in the range 1.05 bar to 1.2 bar, the saturation pressure of the second storage tank 106*b* is in the range 2 bar to 3 bar, the saturation pressure of the third storage tank 106*c* is in the range 4 bar to 5 bar, and the saturation pressure of the fourth storage tank 106*d* is higher than 5 bar. Each storage tank 106*a-d* feeds the type of aircraft 102*a-c* corresponding to its saturation pressure, which corresponds for example for the first storage tank 106*a* to complete filling, for the second storage tank 106*b* to two-thirds filling, for the third storage tank 106*c* to one-third filling and for the fourth storage tank 106*d* to virtually empty filling. These filling values are given for illustrative purposes only. They can in particular vary in the event of prolonged non-use of the airport installation. In fact, in such a case the saturation pressure in a storage tank 106*a-d* increases over time even if no dihydrogen is drawn off from the storage tank 106*a-d*.

The first storage tank 106*a* is fed with dihydrogen by the liquefaction system 50 and the fourth storage tank 106*d* feeds by ventilation the liquefaction system 50 or the fuel cell 54.

When the fourth storage tank 106*c* is practically empty it is filled by the liquefaction system 50. It is then filled completely with a saturation pressure in the range 1.05 bar to 1.2 bar.

At the same time the other storage tanks 106*a-c* are emptied or heated.

The first storage tank 106*a* is then two-thirds full with a saturation pressure in the range 2 bar to 3 bar and can be fed by the tanks 104*a* of the aircraft 102*a* of the first type via an appropriate filling system.

The second storage tank 106*b* is then one-third full with a saturation pressure in the range 4 bar to 5 bar and can be fed by the tanks 104*b* of the aircraft 102*b* of the second type via an appropriate filling system.

The third storage tank 106*c* is then practically empty with a saturation pressure higher than 5 bar and can be fed by the tanks 104*c* of the aircraft 102*c* of the third type via an appropriate filling system. If necessary the dihydrogen ventilated from the third storage tank 106*c* feeds the liquefaction system 50 or the fuel cell 54.

When the third storage tank 106*c* is practically empty it is filled by the liquefaction system 50. It is then filled completely with a saturation pressure in the range 1.05 bar to 1.2 bar.

At the same time the other storage tanks are emptied or heated.

The first storage tank 106*a* is then one-third full with a saturation pressure in the range 4 bar to 5 bar and can be fed by the tanks 104*b* of the aircraft 102*b* of the second type via an appropriate filling system.

The second storage tank 106*b* is then practically empty with a saturation pressure higher than 5 bar and can be fed by the tanks 104*c* of the aircraft 102*c* of the third type via an appropriate filling system. If necessary the dihydrogen ventilated from the second storage tank 106*b* feeds the liquefaction system 50 or the fuel cell 54.

The fourth storage tank 106*d* is two-thirds full with a saturation pressure in the range [2 bar, 3 bar] and can be fed by the tanks 104*a* of the aircraft 102*a* of the first type via an appropriate filling system.

When the second storage tank 106*b* is practically empty it is filled by the liquefaction system 50. It is then filled completely with a saturation pressure in the range 1.05 bar to 1.2 bar.

At the same time the other storage tanks are emptied or heated.

The first storage tank 106*a* is then practically empty with a saturation pressure higher than 5 bar and can be fed by the tanks 104*c* of the aircraft 102*c* of the third type via an appropriate filling system. If necessary the dihydrogen ventilated from the first storage tank 106*a* feeds the liquefaction system 50 or the fuel cell 54.

The third storage tank 106*c* is then two-thirds full with a higher saturation pressure in the range 2 bar to 3 bar and can be fed by the tanks 104*a* of the aircraft 102*a* of the first type via an appropriate filling system.

The fourth storage tank 106*d* is one-third full with a saturation pressure in the range 4 bar to 5 bar and can be fed by the tanks 104*b* of the aircraft 102*b* of the second type via an appropriate filling system.

The first tank 106*a* is then filled again and the cycle recommences.

Each storage tank 106*a-d* therefore effects a permutation and successively assumes the position of the first storage tank with a saturation pressure in the range 1.05 bar to 1.2 bar, of the second storage tank with a saturation pressure in the range 2 bar to 3 bar, of the third storage tank with a saturation pressure in the range 4 bar to 5 bar and of the fourth storage tank with a saturation pressure higher than 5 bar, and so on. The filling means are adapted as and when necessary to enable feeding the type of aircraft corresponding to the saturation pressure. In the same manner the transfer systems are modified accordingly.

Thus, starting from a situation in which the first storage tank 106a has a first degree of filling (full) such that it is at a saturation pressure in the second range P'1 of 1.05 bar to 1.2 bar, in which the second storage tank 106b has a second degree of filling (two-thirds full) such that it is at a saturation pressure in the second range P'2 of 2 bar to 3 bar, in which the third storage tank 106c has a third degree of filling (one-third full) such that it is at a saturation pressure in the second range P'3 of 4 bar to 5 bar, and in which the fourth storage tank 106d has a fourth degree of filling (practically empty) such that it is at a saturation pressure higher than 5 bar, a method of managing the airport installation 200 consists in each storage tank 106a-d going successively and in parallel from the first degree of filling with a saturation pressure in the second range P'1 of 1.05 bar to 1.2 bar to the second degree of filling with a saturation pressure in the second range P'2 of 2 bar to 3 bar to the third degree of filling with a saturation pressure in the second range P'3 of 4 bar to 5 bar to the fourth degree of filling with a saturation pressure higher than 5 bar and to the first degree of filling with a saturation pressure in the second range P'1 of 1.05 bar to 2 bar, and so on.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of providing hydrogen to one or more aircraft at an airport installation, the method comprising:

providing an installation including a first storage tank with dihydrogen at a first pressure range, a second storage tank with dihydrogen at a first pressure range, a third storage tank with dihydrogen at a first pressure range, and a fourth storage tank with dihydrogen at a fourth pressure range, the first pressure ranges of the first storage tank, the second storage tank, the third storage tank, and the fourth storage tank being different from each other; and, filling a tank of an aircraft with dihydrogen, wherein when the first storage tank is at a first degree of filling, the first storage tank is at a saturation pressure in a second range of 1.05 bar to 1.2 bar, the second storage tank is at a second degree of filling such that second storage tank is at a saturation pressure in a second range of 2 bar to 3 bar, the third storage tank is at a third degree of filling such that the third storage tank is at a saturation pressure in a second range of 4 bar to 5 bar, the fourth storage tank is at a fourth degree of filling such that the fourth storage tank is at a saturation pressure higher than 5 bar, such that each storage tank passes successively and in parallel from the first degree of filling with a saturation pressure in the second range of 1.05 bar to 1.2 bar to the second degree of filling with a saturation pressure in the second range of 2 bar to 3 bar to the third degree of filling with a saturation pressure in the second range of 4 bar to 5 bar to the fourth degree of filling with a saturation pressure higher than 5 bar and to the first degree of filling with a saturation pressure in the second range of 1.05 bar to 2 bar.

2. The method as claimed in claim 1, wherein there are three types of aircraft, wherein the first pressure range of the first storage tank is 1.2 bar to 2 bar, wherein the first pressure range of the second storage tank is 2 bar to 4 bar, and wherein the first pressure range of the second storage tank is 4 bar to 6 bar.

3. The method as claimed in claim 2, further comprising:

a first transfer system configured to transfer dihydrogen from a tank of a first type of aircraft to a tank of a second type of aircraft, and a second transfer system configured to transfer dihydrogen from the tank of the second type of aircraft to a tank of a third type of aircraft.

4. The method as claimed in claim 2, further comprising:

a first filling system configured to transfer dihydrogen from a tank of a first type of aircraft to the second storage tank, and a second filling system configured to transfer dihydrogen from a tank of a second type of aircraft to the third storage tank.

5. The method as claimed in claim 2, further comprising:

a first overspill system configured to transfer dihydrogen from the first storage tank to the second storage tank, and a second overspill system configured to transfer dihydrogen from the second storage tank to the third storage tank.

6. The method as claimed in claim 5, further comprising:

a third overspill system configured to transfer dihydrogen from the third storage tank to the fourth storage tank.

7. The method as claimed in claim 6, further comprising:

a filling system configured to transfer dihydrogen from a tank of a third type of aircraft to the fourth storage tank.

8. The method as claimed in claim 2, wherein the storage tanks are fluidically independent of one another.

* * * * *